July 28, 1936. C. L. DAUN 2,048,730
LUBRICATOR
Filed Oct. 30, 1933 2 Sheets-Sheet 1
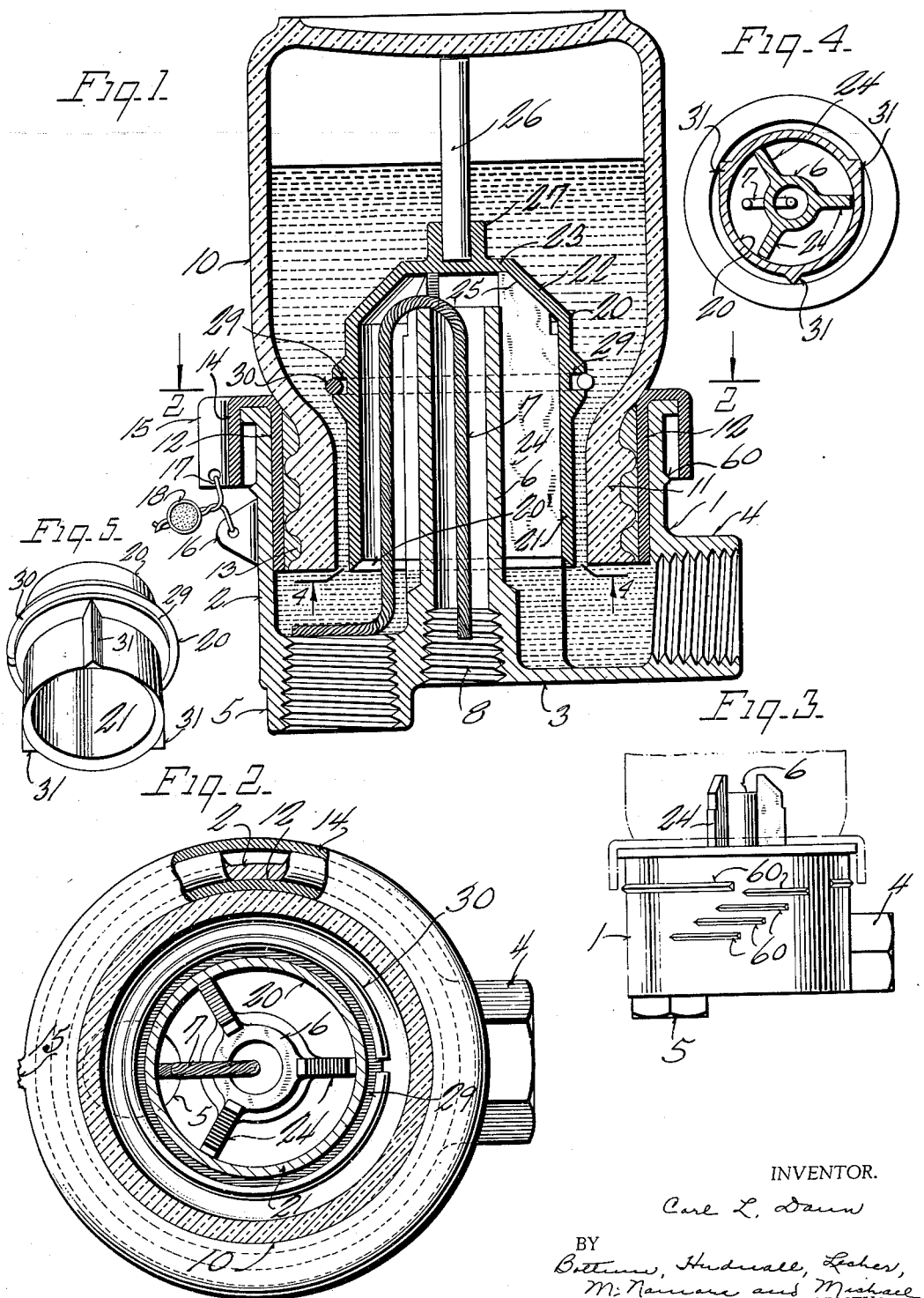
INVENTOR.
Carl L. Daun
BY
ATTORNEYS July 28, 1936.  C. L. DAUN  2,048,730
LUBRICATOR
Filed Oct. 30, 1933  2 Sheets—Sheet 2

INVENTOR.
Carl L. Daun
BY Bottum, Hedwall, Leber,
McNamara and Michael
ATTORNEYS Patented July 28, 1936

2,048,730

UNITED STATES PATENT OFFICE 2,048,730

LUBRICATOR

Carl L. Daun, Milwaukee, Wis., assignor, by direct and mesne assignments, of one-half to William F. Daun, Saginaw, Mich., and one-half to L. Roy Smith and Minta A. Smith, Wauwatosa, Wis.

Application October 30, 1933, Serial No. 695,761

10 Claims. (Cl. 184—103)

This invention relates to an improvement in lubricators adapted for supplying the proper amount of lubricant to various types of bearings.

One object of the present invention is to provide a lubricator capable of maintaining a predetermined feed of lubricant to one or more bearings and which is so constructed and organized as to preclude unauthorized variation of the feed.

Another object is to provide a lubricator of rugged construction adapted for heavy duty service, capable of use as a constant level lubricator and of simultaneously supplying the correct amount of lubricant to oil well or anti-friction bearings and also of affording a wick feed of oil to a sleeve type bearing. The invention is, however, in certain of its aspects and features, capable of advantageous use for average industrial service.

Another object of the invention is to provide a lubricator which has these advantages and capacities and yet is simple and durable in its construction, reliable and effective in operation, susceptible of easy and economical production and yet flexible in the variety of its adaptation to diverse uses.

Other objects and advantages reside in certain novel features of the construction, arrangement and combination of parts which will be hereinafter more fully described and particularly pointed out in the appended claims, reference being had to the accompanying drawings, forming a part of this specification, and in which:

Figure 1 is a view in transverse vertical section illustrating a lubricator embodying the present invention;

Figure 2 is a view in horizontal cross section taken on line 2—2 of Figure 1, parts being shown in elevation and parts being broken away for the sake of illustration;

Figure 3 is a fragmentary view in elevation and on a somewhat reduced scale illustrating the base fitting of the lubricator;

Figure 4 is a sectional view taken on line 4—4 of Figure 1;

Figure 5 is a perspective view of the dome of the lubricator;

Figure 6:
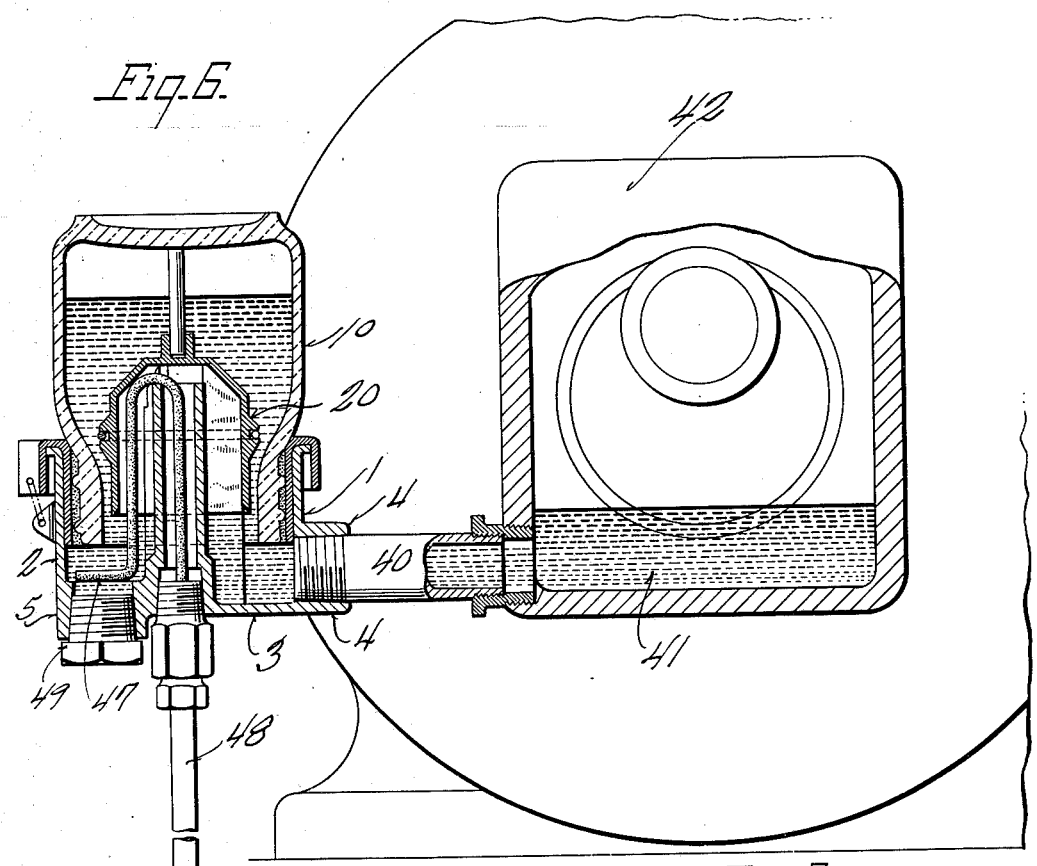
Figure 6 is a view partly in section and partly in elevation showing one application of the lubricator.

Referring to the drawings, the numeral 1 designates generally a cup or base fitting which may be a die casting and comprises a cylindrical body portion 2 having an integral bottom 3 and formed with one or more peripheral outlets 4 and also one or more bottom outlets 5. Any number of the outlets may be operatively connected with the bearings to be lubricated as will be hereinafter pointed out, and those not in use may be conveniently plugged or capped. To adapt the outlets for these uses, they may be internally threaded as illustrated. The cup or base fitting has an integral vent-pipe 6 which extends upwardly from the bottom wall 3. The vent-pipe is open at its ends, one end freely communicating with the oil chamber within the fitting but above the level of the oil therein and the other end communicating with the exterior or with a screened intake or other source of supply of clean air. The vent-pipe is also employed as a conduit for a wick 7 and to facilitate its connection with the instrumentalities with which it is adapted to coact it may have its end internally threaded as at 8.

A container, which may be in the form of an inverted jar 10, is provided and is closed except for the opening at its neck or reduced lower end 11. The neck 11 is surrounded by a collar 12 to which it is united by a plastic connecting layer 13 which may be porcelain or the like. The collar is flanged as indicated at 14 and in the assembly it loosely fits in the open upper end of the cup and its flange 14 hangs over the flanged upper end of the cup to support the container on the base fitting and to appropriately interconnect the two. The flange may be provided with an apertured lug 15 which may be disposed in cooperative relation to a similar apertured lug 16 integral with the base fitting so that a sealing wire 17 may be passed through the apertures and then intertwisted and impressed with a seal 18. This expedient while available is not necessary except to preclude meddling for, as will hereinafter appear, the device itself practically prevents any such tampering as will result in changing of the oil feed. Within the container 10 and supported on the vent-pipe 6 is a bell or hood designated generally at 20 and made up of a sleeve-like body portion 21 open at its lower end and tapering inwardly at its upper end as indicated at 22 into a closed top 23. The bell or hood 20 is centered and properly positioned on the vent-pipe with its top in slightly spaced relation to the upper end of the vent-pipe by means of radially disposed fins or ribs 24 which may be integral with the vent-pipe and extend for substantially the entire length thereof and slightly beyond the upper end of the same. The ribs 24 have inclined or beveled upper end portions 25 conforming to the taper of the portion 22 of the bell 20 to aid in the centering action and facilitate the assembly of the bell 20 with the vent-pipe. A pin or post 26 has its lower end received in and secured in a socket 27 provided on the top of the bell 20 and has its upper end engageable with the end wall of the container 10.

The lower edge of the body portion of the bell 20 is beveled as at 20'. This lower edge controls the level of the lubricant in the oil chamber.

To facilitate assembly of the container 10 with the base fitting or cup 1 and avoid spilling of the oil, the bell 20 is constituted to function as a stopper or closure for the neck of the container and for this purpose the body portion of the bell has an enlarged portion 28 provided with an annular groove 29 which receives a wick or yieldable packing ring 30. When the jar is inverted the bell drops down until the ring 30 has packing engagement with the neck thereby preventing spilling of the oil and facilitating assembly. If a split ring is used as indicated by the drawings the pressure exerted by the neck of the container will cause the ring to contract circumferentially thereby closing up the gap between the split ends and making an effective seal as previously pointed out. To guide and center the bell during this action it may be formed with external guide ribs 31. As soon as the container, bell and base fitting or cup are assembled the engagement of the ribs 24 of the vent-pipe of the bell raises the bell out of the neck of the container.

As illustrated in Figure 6, the outlet 4 is connected by a pipe 40 with an oil well 41 of bearing 42. The desired level of oil is maintained in the oil well by selecting an appropriate size bell 20. Such bells or hoods are provided in various sizes and the one shown in Figure 6 is somewhat shorter than that shown in Figure 1 to provide for a higher oil level. It will be obvious that when the level of the oil drops below the lower edge of the bell air may bubble up through the oil in the container to relieve the vacuum above the oil in the container and permit more oil to flow down into the oil chamber until the level is restored. As shown in Figure 6 the same lubricator may also be employed for supplying a wick feed of lubricant to a sleeve type bearing, as indicated at 45. As shown, a wick 47 has a portion immersed in the oil chamber and is carried up through the dome and then down through the vent-pipe. The vent-pipe is connected to one end of a pipe 48, the other end of which is suitably connected to the bearing 45. With this arrangement the supply of clean air is insured since the air supply comes from the bearing 45. In the application shown in Figure 6 the outlet 5 is capped or plugged as indicated at 49. It is to be understood that in lieu of taking the air supply from a bearing it may be had merely by leaving the lower end of the vent-pipe open or it may be taken from a screened intake coupled up to the vent-pipe.

Figure 7:
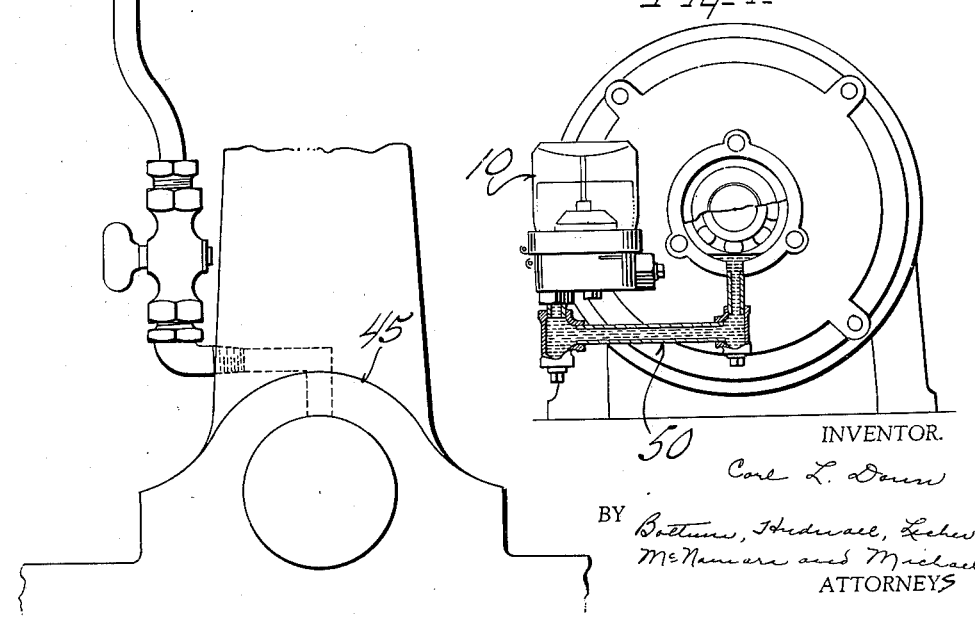
Figure 7 is a similar view showing a lubricator embodying the present invention applied to an anti-friction bearing.

In the form of the invention shown in Figure 7, the lubricator is shown coupled up to an anti-friction bearing and in this instance the outlet 5 is connected by a generally U-shaped connection 50 with the anti-friction bearing. The other outlets except the vent-pipe 6 in this form of the invention may be plugged or, if desired, used to lubricate other bearings. As previously pointed out, the use of bells of different sizes is contemplated and the level at which the particular bell in use maintains the oil in the oil chamber may be conveniently indicated by providing indicating ridges 60 on the base fitting or cup. For example the uppermost ridge indicates the level of the oil in the oil chamber within the base fitting when the shortest of several sizes of bells is employed, while the bottommost ridge indicates that level when the longest of several sizes of bells is employed. Since the level of oil in the bearing well (see Fig. 7) will be the same as the level of oil in oil chamber, the operator by sighting along the various ridges may select that ridge which corresponds with the desired oil level of the bearing well and select that size bell which corresponds with the selected ridge. These ridges are not essential but at times they may be convenient and they may be supplemented by identifying numbers or characters.

It will be understood that the bell controls absolutely the level of the oil and such level may be changed only by substituting a different size bell. Consequently, unauthorized tampering or changing of the oil level is precluded.

While I have shown and described several embodiments of the invention, it is to be understood that the constructions shown have been selected merely for the sake of illustration and example and that various changes in the size, shape, and arrangement of the parts may be made without departing from the spirit of the invention or the scope of the subjoined claims.

The invention claimed is:

1. A lubricator comprising a cup providing a lubricant chamber and having an outlet, an inverted container having its lower end interfitted with the cup and communicating with the chamber thereof, a vent-pipe having its lower end opening through the base of the cup and having its upper end communicating with the interior of the lubricant chamber above the level of lubricant, and a bell within said container and fitted over the vent-pipe, the lower edge of the bell determining the level of lubricant in the lubricant chamber.

2. A lubricator comprising a cup providing a lubricant chamber and having a gravity flow oil outlet, an inverted container having its lower end interfitted with the cup and communicating with the chamber thereof, said cup having an integral vent-pipe, the lower end of which opens through the cup to the exterior and the upper end of which communicates directly with the interior of the lubricant chamber, said vent-pipe being adapted to provide a supply of air to the lubricant chamber and also affording a conduit for the reception of a wick, and means cooperable with the vent-pipe for maintaining a constant level of lubricant in the chamber.

3. A lubricator comprising a cup providing a lubricant chamber and having an outlet, an inverted container having its lower end interfitted with the cup and communicating with the chamber thereof, said cup having an integral vent-pipe, the lower end of which opens through the cup to the exterior and the upper end of which communicates with the interior of the lubricant chamber, said vent-pipe being adapted to provide a supply of air to the lubricant chamber and also affording a conduit for the reception of a wick, and a bell supported on the vent-pipe and having its lower edge controlling the level of the lubricant in the chamber and consequently the flow of lubricant through the outlet.

4. A lubricator comprising a cup having a lubricant chamber therein and also having an outlet, an inverted container closed except for its lower open end, a collar surrounding and interconnected with the lower open end and loosely interfitted with the cup, a vent-pipe extending up through the cup and affording communication between the exterior and the interior of the lubricant chamber above the level of the lubricant therein, and a bell mounted on the vent-pipe and having its lower end controlling the level of the lubricant in said chamber.

5. A lubricator comprising a cup having a lubricant chamber therein and also having an outlet, an inverted container closed except for its lower open end, a collar surrounding and interconnected with the lower open end and loosely interfitted with the cup, a vent-pipe extending up through the cup and affording communication between the exterior and the interior of the lubricant chamber above the level of the lubricant therein, a bell mounted on the vent-pipe and having its lower end controlling the level of the lubricant in said chamber, and means carried by said bell and cooperable with the open end of the container for closing the same when the container is inverted and disassembled from the cup, said vent-pipe coacting with the bell to move said means to open position in the assembly.

6. A lubricator comprising a base having a lubricant chamber therein and provided with a peripheral outlet, an inverted container closed except for its lower open end, a collar surrounding and connected to said lower end of the container and loosely interfitted with the opening in the base, a vent-pipe associated with the base and affording communication between the exterior and a portion of the lubricant chamber above the level of the lubricant, said vent-pipe having radial fins provided with beveled upper ends, and a bell having a beveled portion corresponding to the bevel of the upper ends of said fins, said bell being fitted over said vent-pipe and said fins and having its lower end controlling the level of the lubricant in said chamber.

7. A lubricator comprising a base fitting, an inverted jar interconnected therewith, said base fitting having a vent-pipe and a bell mounted on the vent-pipe and controlling the level of lubricant in the base fitting.

8. A lubricator comprising a cylindrical body portion having outlets and having a vent-pipe extending upwardly from the bottom wall, a container for the lubricant interfitted with the body portion, and a bell within the container and cooperable with the vent-pipe to control the level of lubricant in said cylindrical body portion.

9. A lubricator comprising a cylindrical body portion having outlets and having a vent-pipe extending upwardly from its bottom wall, a container for the lubricant interfitted with the body portion, and a bell within the container and cooperable with the vent-pipe to control the level of lubricant in said cylindrical body portion, said bell having means cooperable with the container to prevent the flow of lubricant therefrom when the container is inverted and disassembled from the body portion.

10. A lubricator comprising a cylindrical body portion having outlets and having a vent-pipe extending upwardly from its bottom wall, a container for the lubricant interfitted with the body portion, and a bell within the container and cooperable with the vent-pipe to control the level of lubricant in said cylindrical body portion, said bell having a yieldable sealing ring cooperable with the container to prevent the flow of lubricant therefrom when the container is inverted and disassembled from the body portion.

CARL L. DAUN.